United States Patent
Kim et al.

(10) Patent No.: US 8,500,603 B2
(45) Date of Patent: Aug. 6, 2013

(54) BRAKE SYSTEM FOR VEHICLE WITH IDLE STOP AND GO DEVICE AND CONTROL METHOD THEREOF

(75) Inventors: Younghak Kim, Gyeonggi-do (KR); Byoungwoo Hwang, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 358 days.

(21) Appl. No.: 12/898,543

(22) Filed: Oct. 5, 2010

(65) Prior Publication Data

US 2011/0136624 A1 Jun. 9, 2011

(51) Int. Cl.
*B60W 10/06* (2006.01)
*B60W 10/04* (2006.01)

(52) U.S. Cl.
USPC .......................... 477/201; 477/186

(58) Field of Classification Search
USPC ................. 477/183, 184, 186, 187, 199, 200, 477/201, 202
See application file for complete search history.

(56) References Cited

U.S. PATENT DOCUMENTS

| 4,630,577 | A | * | 12/1986 | Cornacchia | 123/179.3 |
| 5,580,136 | A | * | 12/1996 | Hanschek | 303/155 |
| 7,882,920 | B2 | * | 2/2011 | Nitta et al. | 180/268 |
| 8,277,365 | B2 | * | 10/2012 | Ohbayashi et al. | 477/183 |
| 2005/0140208 | A1 | | 6/2005 | Ji | |
| 2006/0079377 | A1 | * | 4/2006 | Steen et al. | 477/186 |

FOREIGN PATENT DOCUMENTS

| JP | 2004210110 A | 7/2004 |
| JP | 2005186928 A | 7/2005 |
| KR | 10-2005-0019814 | 3/2005 |
| KR | 10-2005-0102439 A | 10/2005 |
| KR | 10-0859662 | 9/2008 |
| KR | 10-2009-0120392 A | 11/2009 |

* cited by examiner

*Primary Examiner* — Roger Pang
(74) *Attorney, Agent, or Firm* — Edwards Wildman Palmer LLP; Peter F. Corless

(57) ABSTRACT

The present invention provides a brake system for a vehicle with an idle stop and go comprising a valve assembly disposed in a brake line for supplying brake pressure to the wheels by operation of the brake pedal to open or close the brake line; and a controller controlling the valve assembly.

4 Claims, 4 Drawing Sheets

BRAKE SYSTEM FOR VEHICLE WITH IDLE STOP AND GO DEVICE AND CONTROL METHOD THEREOF

CROSS-REFERENCE TO RELATED APPLICATIONS

The present application claims under 35 U.S.C. §119(a) the benefit of Korean Patent Application Number 10-2009-0119727 filed Dec. 4, 2009, the entire contents of which application is incorporated herein for all purposes by this reference.

BACKGROUND OF THE INVENTION

1. Field of the Invention

The present invention relates, generally, to a brake system for a vehicle with an idle stop and go device, and more particularly to a braking technology wherein a vehicle with an idle stop and go device restarts after entering an idle stop state.

2. Description of Related Art

An idle stop & go (hereafter, referred to ISG or ASG (Automatic Stop & Go)) device is a kind of fuel-saving device that stops the engine in an idle state of a vehicle and automatically starts the engine when restarting the vehicle.

For example, it is a device that automatically stops the engine when a vehicle stops at a traffic light and automatically starts the engine when the traffic light changes and the driver presses down the accelerator pedal.

Accordingly, the ISG was designed to save fuel and prevent exhaust from being generated while the engine stops, and is particularly advantageous in commercial vehicles rather than general vehicles, and in the city rather than a highway.

Operation of existing brake systems while the vehicle is equipped with the ISG restart after entering the idle stop state is illustrated in FIG. 1.

Accordingly, the engine stops when the driver presses down on the brake pedal and the vehicle stops, and then the engine restarts when the driver releases the brake pedal and presses down the accelerator pedal to restart the vehicle.

However, there is an amount of time from when the driver releases the brake pedal to restart, as described above, to when the engine actually restarts and the vehicle is driven. Therefore, when a vehicle stops and restarts on an uphill road, the vehicle moves back at a predetermined reverse velocity before moving forward, or on a downhill road, the vehicle moves forward before the engine starts and then accelerates.

In other words, the vehicle moves irrespective of the driver's intention when restarting from the idle stop state, and as a result safety problems may occur.

Accordingly, there is a need in the art for brake systems for a vehicle with idle stop and go.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

The present invention provides a brake system for a vehicle with idle stop and go that suitably improves stability by stopping the vehicle until the vehicle is started in accordance with the driver's intention after the driver releases the brake pedal and the engine actually restarts.

A preferred embodiment of the present invention provides a brake system for a vehicle with an idle stop and go device, which preferably includes a valve assembly disposed in a brake line for supplying brake pressure to the wheels by operation of the brake pedal to open or close the brake line; and a controller controlling the valve assembly in accordance with the vehicle velocity, engine operation state, brake pedal operation state, alternator operation state, and accelerator pedal operation state.

Another preferred embodiment of the present invention provides a control method of the brake systems for a vehicle with an idle stop and go device that includes an idle stop enter determination step for determining that the brake pedal is in operation, wherein the vehicle stops at velocity 0, and the engine stops, such that a vehicle has entered an idle stop state; a brake-fixing step closing the brake line by controlling a valve assembly to close the braking lines, when it is suitably determined that the vehicle is in the idle stop state as a result of the idle stop enter determination step; a driving-preparing determination step suitably determining that the L-terminal of the alternator is open and the APS signal is above a predetermined value; and an un-braking step opening the braking line by controlling the valve assembly, when it is suitably determined that the L-terminal of the alternator is open and the APS signal is above a predetermined value as a result of the driving-preparing determination step.

According to further preferred embodiments of the present invention, it is possible to suitably prevent behaviors of the vehicle that may be unexpected by a driver and to improve stability by suitably stopping the vehicle until a time at which the vehicle is started after the driver releases the brake pedal and the engine actually restarts.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

The above and other features of the present invention will now be described in detail with reference to certain exemplary embodiments thereof illustrated by the accompanying drawings which are given hereinafter by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION OF THE INVENTION

As described herein, the present invention features a brake system for a vehicle with an idle stop and go device, the brake system comprising a valve assembly disposed in a brake line for supplying brake pressure to the wheels by operation of the brake pedal to open or close the brake line, and a controller controlling the valve assembly.

In one embodiment, the controller controls the valve assembly in accordance with the vehicle velocity, engine operation state, brake pedal operation state, alternator operation state, or accelerator pedal operation state.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
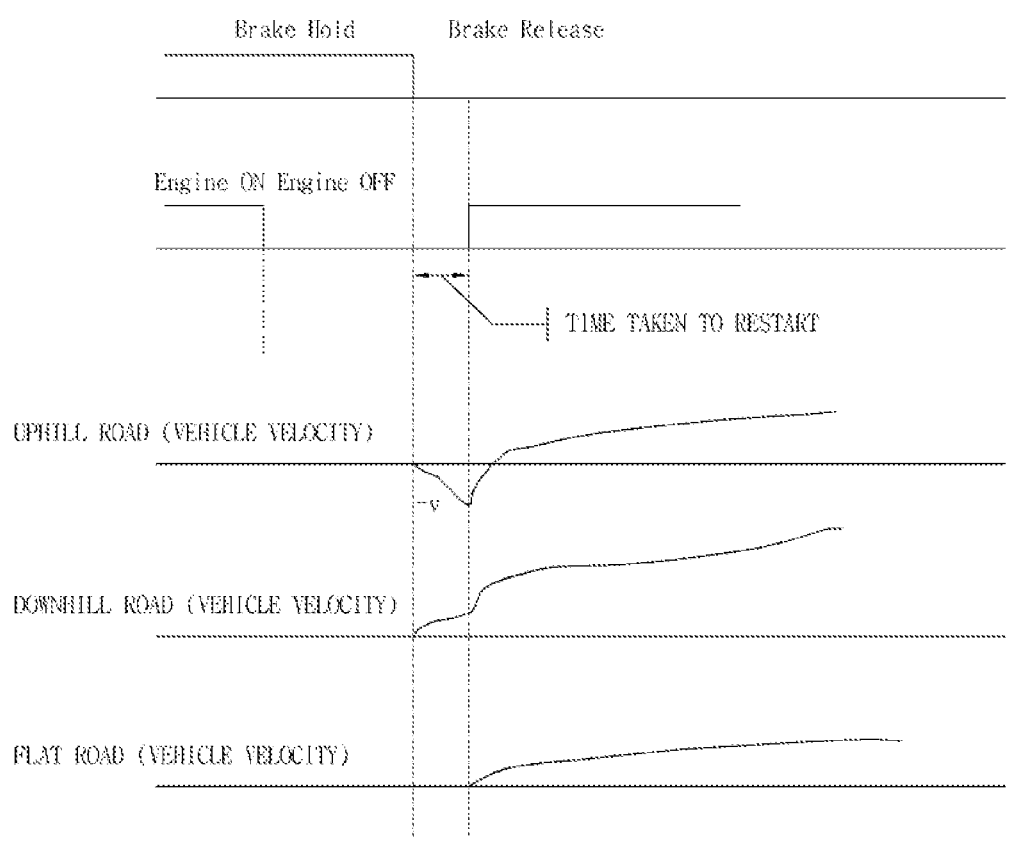
FIG. 1 is a graph illustrating the behavior of a vehicle in the related art when it restarts from an idle stop state.
Figure 2:
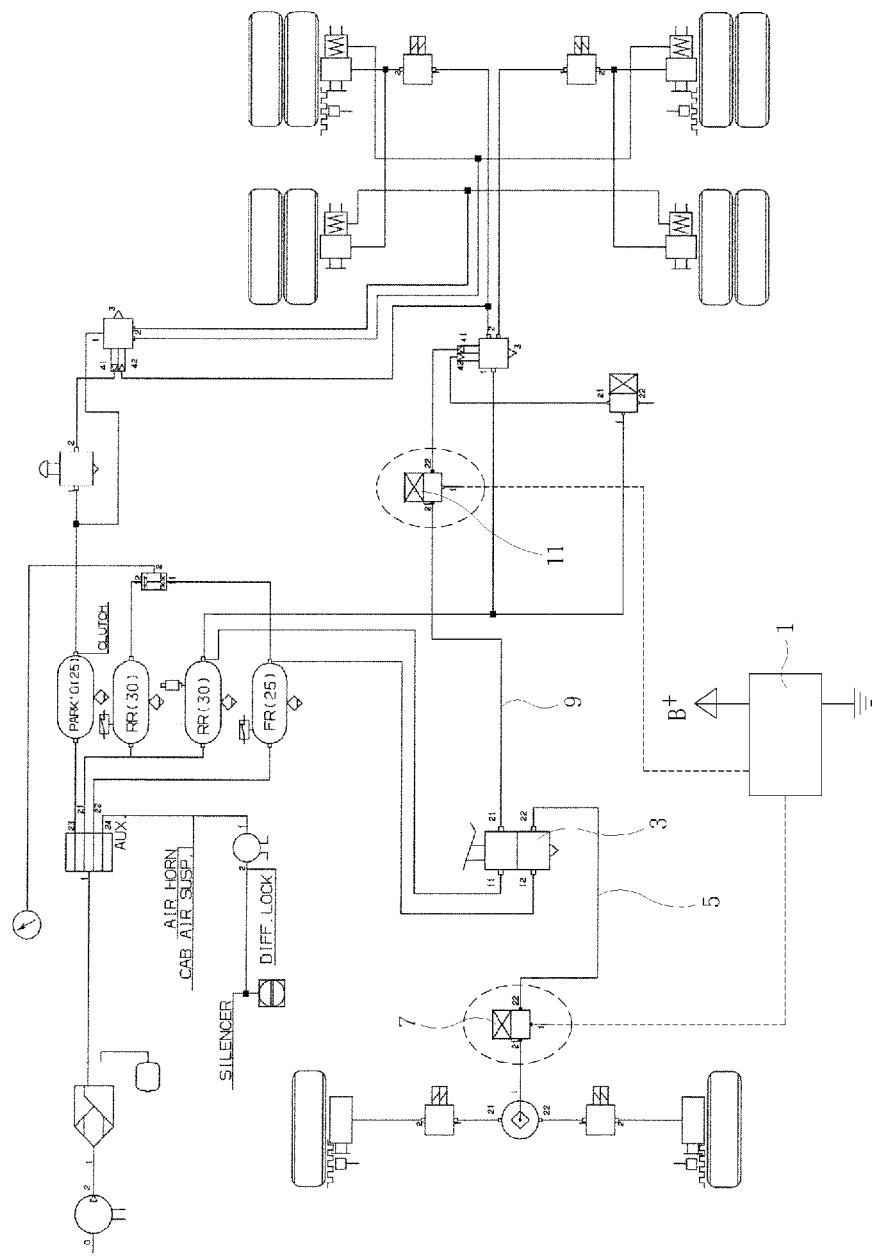
FIG. 2 is a view showing an example of a brake system for a vehicle with an idle stop and go device according to preferred embodiments of the present invention.

According to certain preferred embodiments, and referring to FIG. 2, an embodiment of a brake system for a vehicle with an idle stop and go device of the present invention preferably includes a valve assembly disposed in a brake line for supplying brake pressure to the wheels by operation of the brake pedal to open or close the brake line, and a controller 1 controlling the valve assembly in accordance with the vehicle velocity, engine operation state, brake pedal operation state, alternator operation state, and accelerator pedal operation state.

According to certain preferred embodiments, the valve assembly is preferably composed of a first solenoid valve 7 that is suitably disposed in a front wheel brake line 5 connected to a dual brake valve 3 to supply brake pressure to the front wheels, and a second solenoid valve 11 that is suitably disposed in a rear wheel brake line 9 connected to dual brake valve 3 to supply brake pressure to the rear wheels.

Preferably, controller 1 is suitably configured to close a front wheel brake line 5 and a rear wheel brake line 9 from a first solenoid valve 7 and second solenoid valve 11, respectively, when the brake pedal operates, the vehicle velocity is 0, and the engine is not in operation, and to release first solenoid valve 7 and second solenoid valve 11 to open to the front wheel brake line 5 and rear wheel brake line 9, when the L-terminal of the alternator opens and an APS (Accelerator Position Sensor) signal above a predetermined value is inputted.

In other certain preferred embodiments, controller 1 can be suitably connected with a brake pedal sensor, a vehicle velocity sensor, the L-terminal of the alternator, and the APS to receive corresponding signals, and confirm the operation state of the engine by being connected with an engine ECU (Electronic Control Unit).

Preferably, in this configuration, the predetermined value compared with the APS signal is set enough to confirm that a driver suitably drives the vehicle and the vehicle starts, and it is appropriately set by experiments and analysis and inputted in advance for a controller 1 to refer to.

Figure 3:
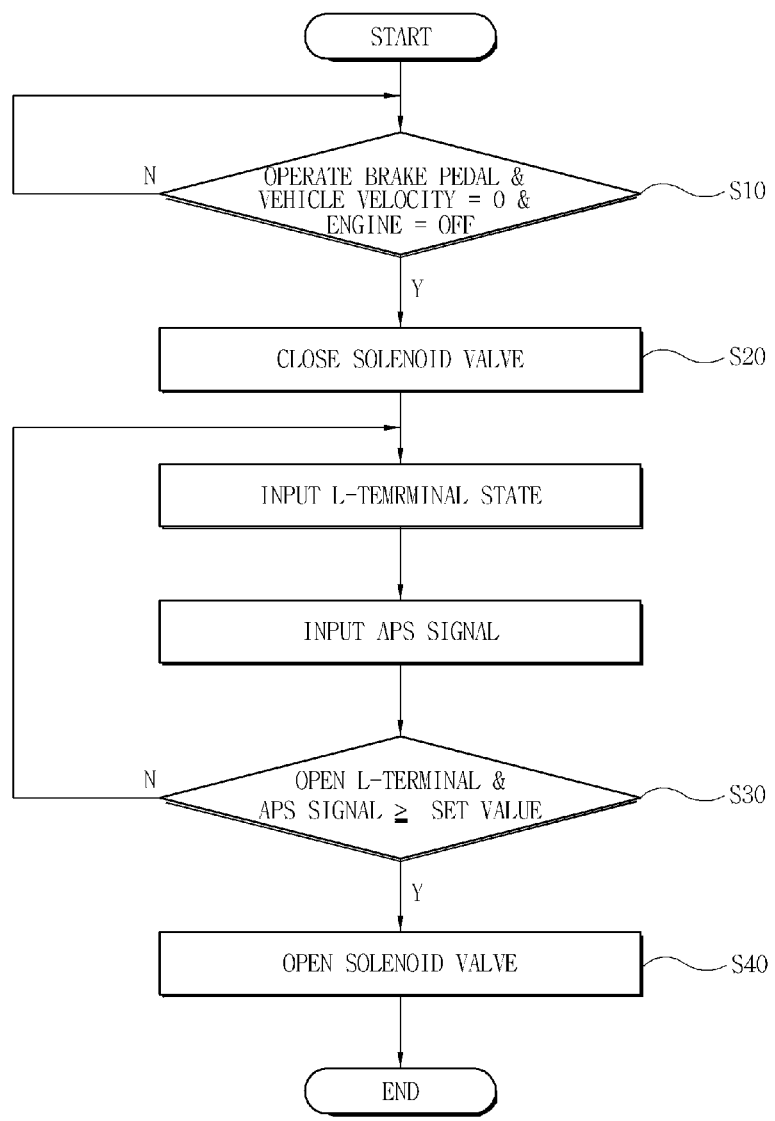
FIG. 3 is a flowchart illustrating an embodiment of a method of controlling a brake system for a vehicle with an idle stop and go device according to preferred embodiments of the present invention.

In other certain preferred embodiments, a method of controlling the brake system for a vehicle with an idle stop and go device having the above configuration of the present invention is described with reference to the flow chart shown in FIG. 3 and FIG. 4.

Preferably, when a drive presses down the brake pedal and the vehicle stops, the engine is suitably stopped in an idle stop state.

According to certain preferred embodiments, a controller 1 performs an idle stop enter determination step S10 suitably determining that the brake pedal is in operation, the vehicle stops at velocity 0, and the engine stops in response to signals from the brake pedal sensor, the vehicle velocity sensor, and the engine ECU.

Preferably, when it is determined that the vehicle is in the idle stop state as a result of the idle stop enter determination step S10, a brake-fixing step S20 fixing the brake state by controlling first solenoid valve 7 and second solenoid valve 11 of the valve assembly to close front wheel brake line 5 and rear wheel brake line 9 is suitably performed.

According to further preferred embodiments, since the driver has pressed down the brake pedal when the vehicle enters the idle stop state, the brake pressure is suitably exerted in the wheels. Preferably, in this state, when both of front wheel brake line 5 and rear wheel brake line 9 are suitably closed, the brake pressure exerted in the wheels cannot be removed even if the driver releases the brake pedal, such that the wheels are kept braked.

Accordingly, the vehicle is still braked even if the driver releases the brake pedal to restart the vehicle, such that it can stably maintain the stop position without moving forward or backward.

Preferably, in the position described above, when the driver presses down the accelerator pedal and the engine starts, controller 1 performs a driving-preparing determination step S30 determining that the L-terminal of the alternator is open and the APS signal is above a suitably predetermined value.

According to other further preferred embodiments, since when the vehicle enters the idle stop state and the engine stops, the L-terminal of the alternator grounds, and when the engine starts, the L-terminal opens from the ground state, suitably determining that the L-terminal of the alternator is open is for determining that the engine is started by these changes.

Further, in preferred exemplary embodiments, when it is determined that the L-terminal of the alternator is open and the APS signal is above a suitably predetermined value as a result of the driving-preparing determination step S30, the controller suitably performs an un-braking step S40 opening the braking line by controlling first solenoid valve 7 and second solenoid valve 11 of the valve assembly.

According to other further embodiments, when the L-terminal of the alternator is open and the APS signal is suitably above a predetermined value, the vehicle is starting after finishing the idle stop state and starting the engine, such that it is suitably determined that the driving force can be suitably transmitted from the engine to the wheels. Accordingly, the pressure braking the wheels are suitably removed and the vehicle can smoothly starts.

Figure 4:
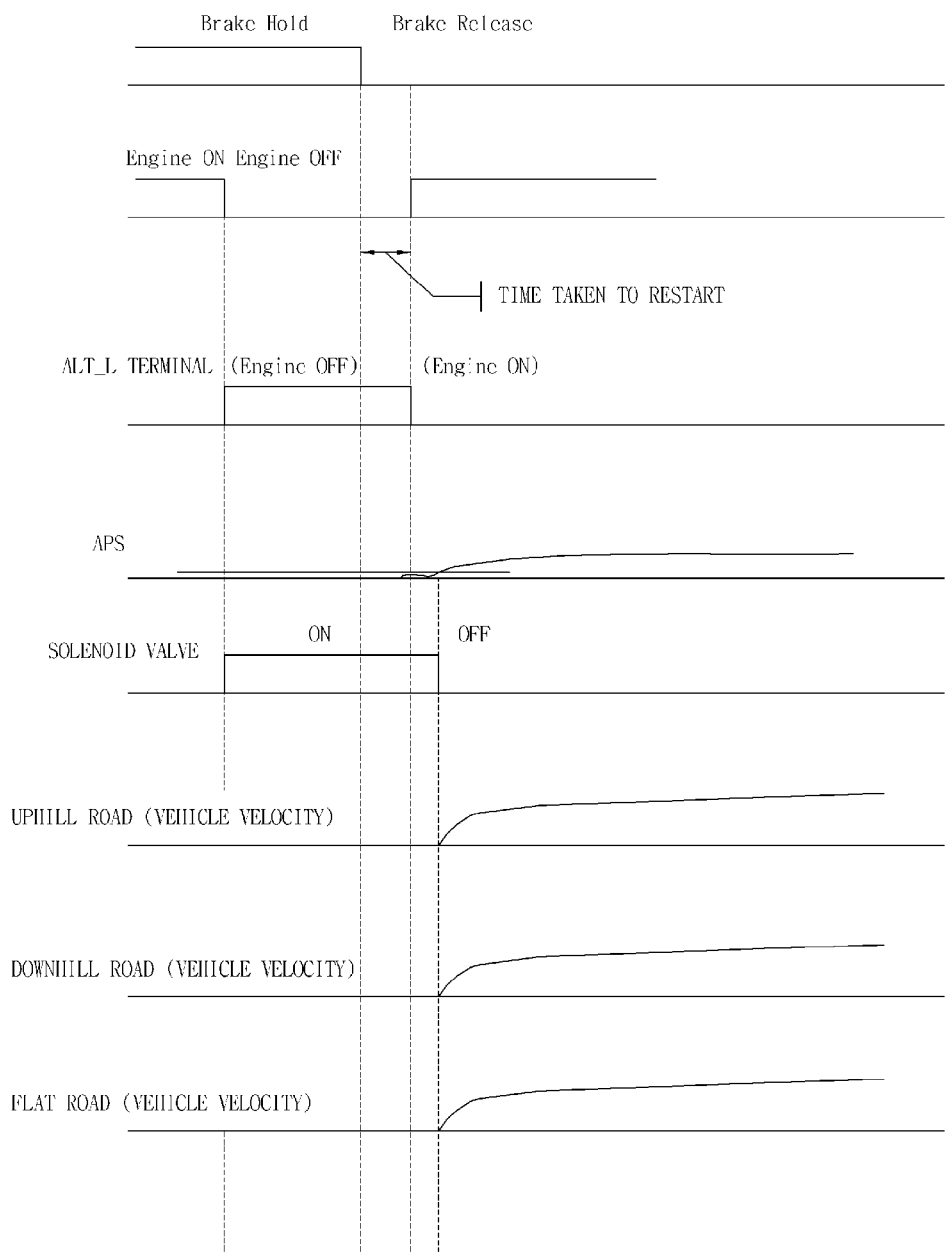
FIG. 4 is a graph illustrating the behavior of a vehicle according to preferred embodiments of the present invention when it stops in an idle stop state and then restarts from an idle stop state.

Accordingly, in certain exemplary embodiments, for example, as shown in FIG. 4, the vehicle can preferably move in accordance with the driver's intention without moving forward or backward not only on a flat road, but on an uphill road and a downhill road when restarting after idle stop.

As described herein, according to preferred embodiments of the present invention, it is possible to suitably ensure stable and reliable travel ability by automatically maintaining braking pressure keep a vehicle stably stopped until the engine restarts to restart the vehicle after an idle stop state and automatically removing the braking pressure at an appropriate time for restarting the vehicle.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A brake system for a vehicle with an idle stop and go device, the brake system comprising:
    a valve assembly disposed in a brake line for supplying brake pressure to the wheels by operation of the brake pedal to open or close the brake line; and
    a controller controlling the valve assembly in accordance with the vehicle velocity, engine operation state, brake pedal operation state, alternator operation state, and accelerator pedal operation state.

2. The brake system as defined in claim 1, wherein the valve assembly includes:
    a first solenoid valve disposed in a front wheel brake line connected to a dual brake valve to supply brake pressure to the front wheels; and
    a second solenoid valve disposed in a rear wheel brake line connected to dual brake valve to supply brake pressure to the rear wheels.

3. The brake system as defined in claim 2, wherein the controller is configured to close the front wheel brake line and the rear wheel brake line from the first solenoid valve and the second solenoid valve, respectively, when the brake pedal operates, the vehicle velocity is 0, and the engine is not in operation, and
    to release the first solenoid valve and the second solenoid valve to open to the front wheel brake line and the rear wheel brake line, when the L-terminal of an alternator opens and an APS signal above a predetermine value is inputted.

4. A control method of the brake systems of claim 1, comprising:
    an idle stop enter determination step determining that the brake pedal is in operation, the vehicle stops at velocity 0, and the engine stops, such that a vehicle has entered an idle stop state;
    a brake-fixing step fixing the brake state by controlling the valve assembly to close the braking lines, when it is determined that the vehicle is in the idle stop state as a result of the idle stop enter determination step;
    a driving-preparing determination step determining that the L-terminal of the alternator is open and the APS signal is above a predetermined value; and
    an un-braking step opening the braking line by controlling the valve assembly, when it is determined that the L-terminal of the alternator is open and the APS signal is above a predetermined value as a result of the driving-preparing determination step.

* * * * *